US011947281B1

(12) United States Patent
Huang et al.

(10) Patent No.: US 11,947,281 B1
(45) Date of Patent: Apr. 2, 2024

(54) METHOD FOR FILLING TONER INTO TONER CARTRIDGE

(71) Applicants: GENERAL PLASTIC INDUSTRIAL CO., LTD., Taichung (TW); KATUN CORPORATION, Minneapolis, MN (US)

(72) Inventors: Shih-Hsiung Huang, Taichung (TW); Kuan-Tung Li, Taichung (TW); Thn-Chn Yu, Taichung (TW); Chin-His Chuang, Taichung (TW); Jean Guay, Taichung (TW)

(73) Assignees: GENERAL PLASTIC INDUSTRIAL CO., LTD., Taichung (TW); KATUN CORPORATION, Minneapolis, MN (US)

( * ) Notice: Subject to any disclaimer, the term of this patent is extended or adjusted under 35 U.S.C. 154(b) by 0 days.

(21) Appl. No.: 18/082,151

(22) Filed: Dec. 15, 2022

(51) Int. Cl.
*G03G 15/08* (2006.01)

(52) U.S. Cl.
CPC ................................ *G03G 15/0865* (2013.01)

(58) Field of Classification Search
CPC ........... G03G 15/0865; G03G 15/0867; G03G 15/0874; G03G 15/0894; G03G 21/181; G03G 2215/00987
See application file for complete search history.

(56) References Cited

U.S. PATENT DOCUMENTS

| | | | | | |
|---|---|---|---|---|---|
| 5,311,265 | A * | 5/1994 | Miller | G03G 15/0894 222/DIG. 1 |
| 5,392,963 | A * | 2/1995 | Kelly | G03G 15/0874 222/DIG. 1 |
| 2014/0027012 | A1 * | 1/2014 | Saitoh | G03G 15/0867 141/10 |

FOREIGN PATENT DOCUMENTS

JP 2006235046 A * 9/2006

* cited by examiner

*Primary Examiner* — Thomas S Giampaolo, II
(74) *Attorney, Agent, or Firm* — MUNCY, GEISSLER, OLDS & LOWE, P.C.

(57) ABSTRACT

A method for filling toner into a toner cartridge includes the steps of (a) taking a container, which accommodates the toner therein and has opposite first and second ends, and then forming a toner outlet at the first end, (b) sleeving the toner cartridge, which is provided at an end thereof with an opening, onto the container from the first end to the second end via the opening, (c) forming an air permeable hole at the second end, (d) withdrawing the container from the toner cartridge to enable the toner to leave the container via the toner outlet and stay inside the toner cartridge, and (e) sealing the opening of the toner cartridge by a cover. The method is simple and convenient to operate. With the method, the toner can be effectively filled without leakage and with reduced amount of residual toner.

9 Claims, 5 Drawing Sheets

METHOD FOR FILLING TONER INTO TONER CARTRIDGE

BACKGROUND OF THE INVENTION

1. Field of the Invention

The present invention relates generally to a toner cartridge of an electronic image-forming apparatus and more particularly, to a method for filling toner into the toner cartridge.

2. Description of the Related Art

Electronic image-forming apparatuses, such as laser printers, generally use toner as the raw material for printing. For the convenience of replenishing toner, the toner is filled in a toner cartridge, which is in turn installed in the printer for use. When the toner contained in the toner cartridge is used up, a new toner cartridge that is full of toner will be used to replace the empty one. In this way, the operation of replenishing toner is very convenient, and ordinary consumers can replace it by themselves without the assistance of professional technicians.

However, the used toner cartridge usually needs to be handed over to the manufacturer for recycle, and thereafter the recycling toner cartridge must be refilled with new toner by a toner filling machine. Otherwise, the used toner will be discarded, which is neither economical nor environmentally friendly. To enable consumers to fill new toner into the original toner cartridge by themselves, various toner refilling packs are developed and commercially available. However, the structures of some of existing toner refilling packs are not perfect, resulting in inconvenience in toner filling operation. Such toner refilling packs usually have the disadvantage of complicated operation procedure and the problems of leakage of toner and excessive amount of residual toner. In another aspect, some of the conventional toner refilling packs may have complicated structures to be operated conveniently. However, they may have higher cost and will still become garbage after they have been used and then discarded. Therefore, how to balance easy operation, positive refill of toner without leakage, low cost and environmental protection has become an issue to be solved in the industry.

SUMMARY OF THE INVENTION

The present invention has been accomplished in view of the above-noted circumstances. It is an objective of the present invention to provide a method for filling toner into a toner cartridge, which can be operated easily and can effectively fill toner without leakage.

It is another objective of the present invention to provide a methods for filling toner into a toner cartridge, which can reduce the amount of residual toner, and can be operated with low cost and environmentally friendly.

To attain the above-mentioned objectives, the present invention provides a method for filling toner into a toner cartridge, which comprises the steps of (a) taking a container, which accommodates the toner therein, and has a first end and a second end opposite to the first end, and then forming a toner outlet at the first end; (b) taking a toner cartridge that is provided at an end thereof with an opening, and then sleeving the toner cartridge onto the container via the opening from the first end to the second end; (c) forming an air permeable hole at the second end of the container; (d) withdrawing the container from the toner cartridge to enable the toner to leave the container via the toner outlet and stay inside the toner cartridge; and (e) sealing the opening of the toner cartridge by a cover. As a result, the method for filling toner into a toner cartridge provided by the present invention can be operated easily and conveniently. With the method of the present invention, the toner can be effectively and positively filled into the toner cartridge without leakage so as to reduce the amount of residual toner. The method of the present invention can be operated with low cost and is environmentally friendly.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Hereunder an embodiment will be detailedly described with accompanying drawings for illustrating technical features and advantages of the present invention. Referring to FIGS. 1-5, the method for filling toner into a toner cartridge provided in accordance with a preferred embodiment of the invention comprises the following steps.

Figure 1:
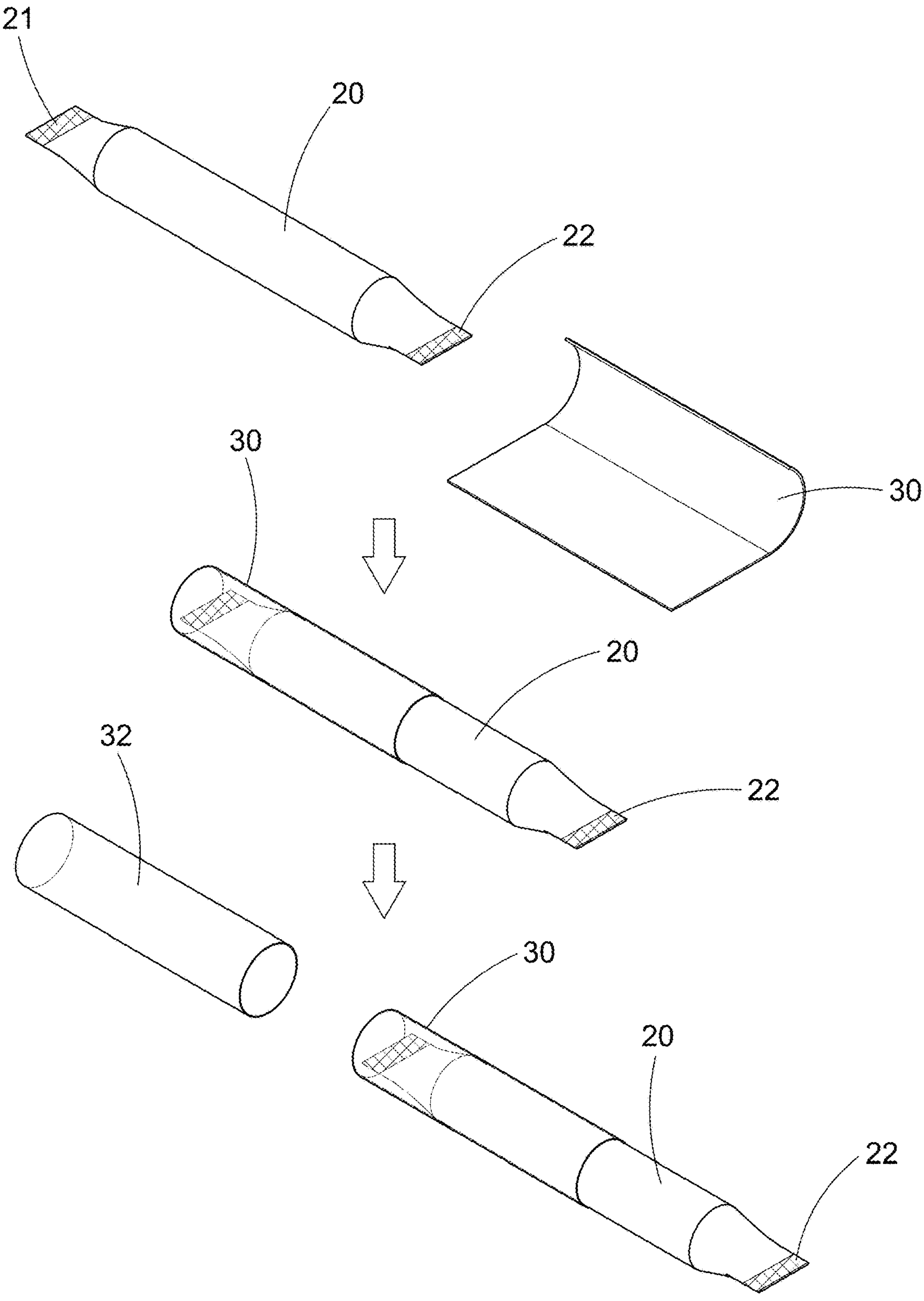
FIG. 1 to FIG. 5 schematically depict the steps of a method for filling toner into a toner cartridge according to a preferred embodiment of the present invention.
Figure 2:
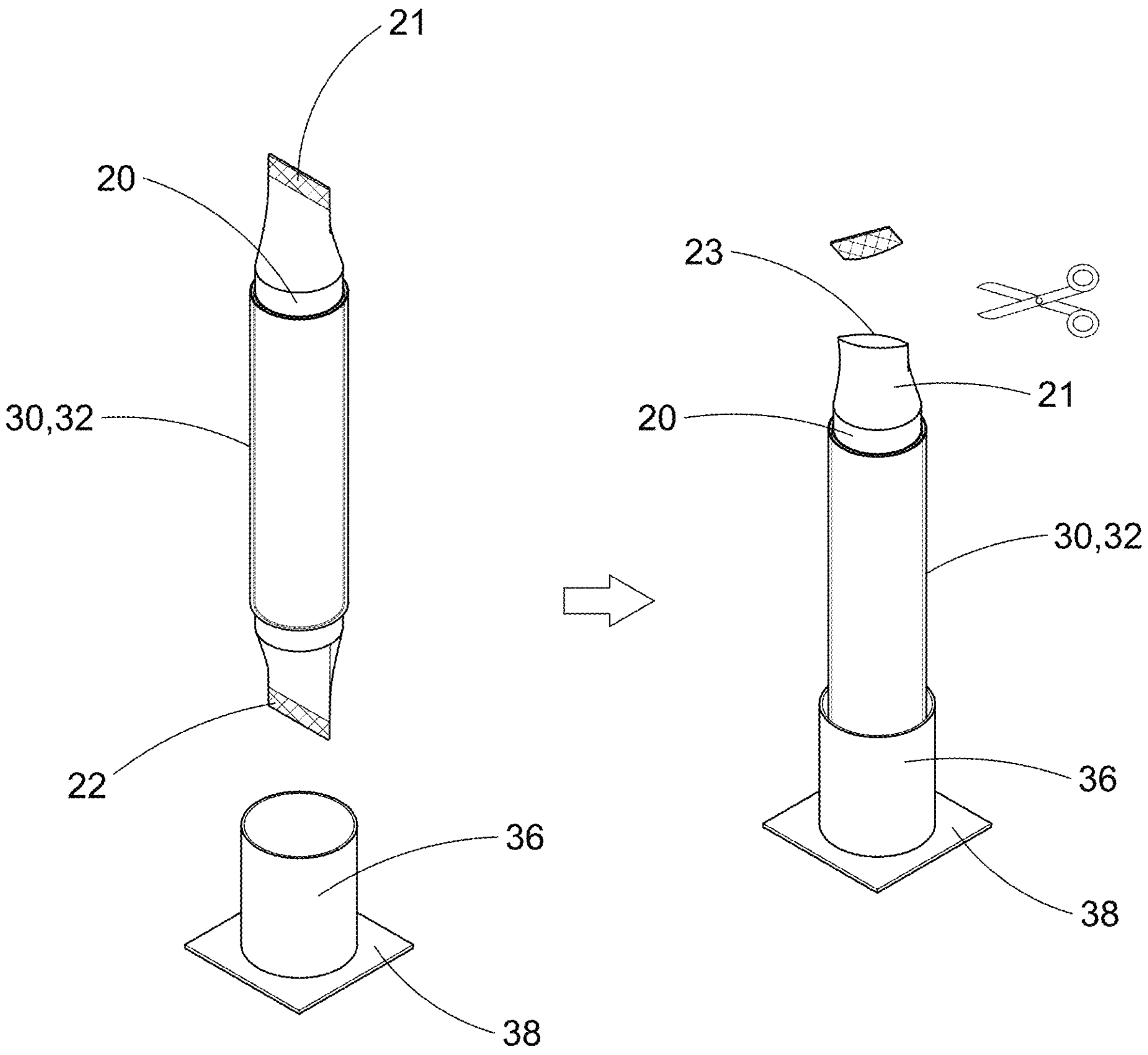
Figure 3:
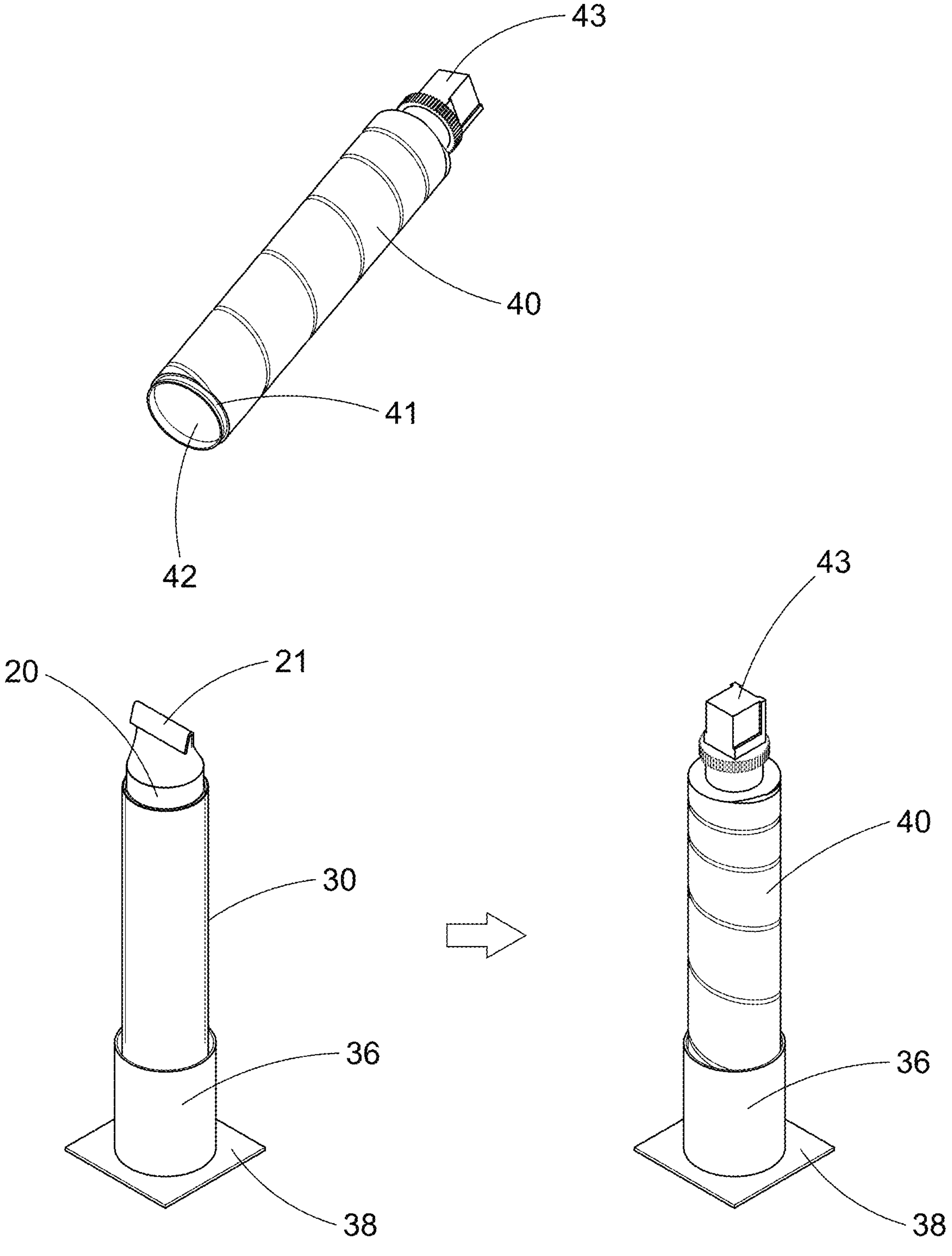

Step (a): Take a container 20 accommodating toner 10 therein. The container 20 is made of soft plastic material and has a cylindrical shape with a first end 21 and a second end 22 opposite to the first end 21. In this embodiment, the container 20 is realized as an elongated plastic bag having an inside accommodation receiving the toner 10. To facilitate insertion of the container 20 into an elongated toner cartridge 40, a molding sheet 30 may be used to wrap around the outer peripheral of the container 20. Because the molding sheet 30 is made of hard plastic material, such as polyethylene terephthalate (PET), the container 20 can be restricted and shaped as a cylindrical shape. In this step, the molding sheet 30 and the container 20 may be further inserted into a tubular jig 32. Because the molding sheet 30 warps around about a half of the container 20, the container 20 can be smoothly inserted into the tubular jig 32. Thereafter, make the first and second ends 21, 22 of the container 20 be exposed outside the tubular jig 32. Because the tubular jig 32 has a constant diameter and is made of hard plastic material, such as PET, the diameter of the container 20 can be restricted in a certain value, thereby facilitating insertion of the container 20 into the toner cartridge 40 in the subsequent step. In another embodiment, the container 20 itself may be made of hard plastic material, such as PET. In this way, the container 20 can be smoothly inserted into the toner cartridge 40 in the subsequent step without the need of the molding sheet 30 or the tubular jig 32, or the container 20 can be smoothly and directly inserted into the tubular jig 32 without the need of the molding sheet 30. As shown in FIG. 2, in this step, the container 20 is held in an upright posture in a way that the first end 21 of the container 20 faces upwardly, and the second end 22 is inserted into a retaining barrel 36, which stands on a table or the ground by the bottom plate 38, such that the container 20 extends uprightly. Thereafter, use scissors, a knife, a blade, or other device to form a toner outlet 23 at the first end 21, such that the toner outlet 23 is in communication with the inner accommodation of the container 20, and then fold back the first end 21 toward the second end 22, as shown in FIG. 3, to temporarily close the toner outlet 23 so as to prevent the container 20 from leakage of toner during the process of sleeving the toner cartridge 40 onto the container 20. However, in another embodiment, the process of holding the container 20 uprightly or the process of backwardly folding the first end 21 may be omitted. Alternatively, the container 20 may be held by user's hand in the upright posture without the need of the retaining barrel 36.

Figure 4:
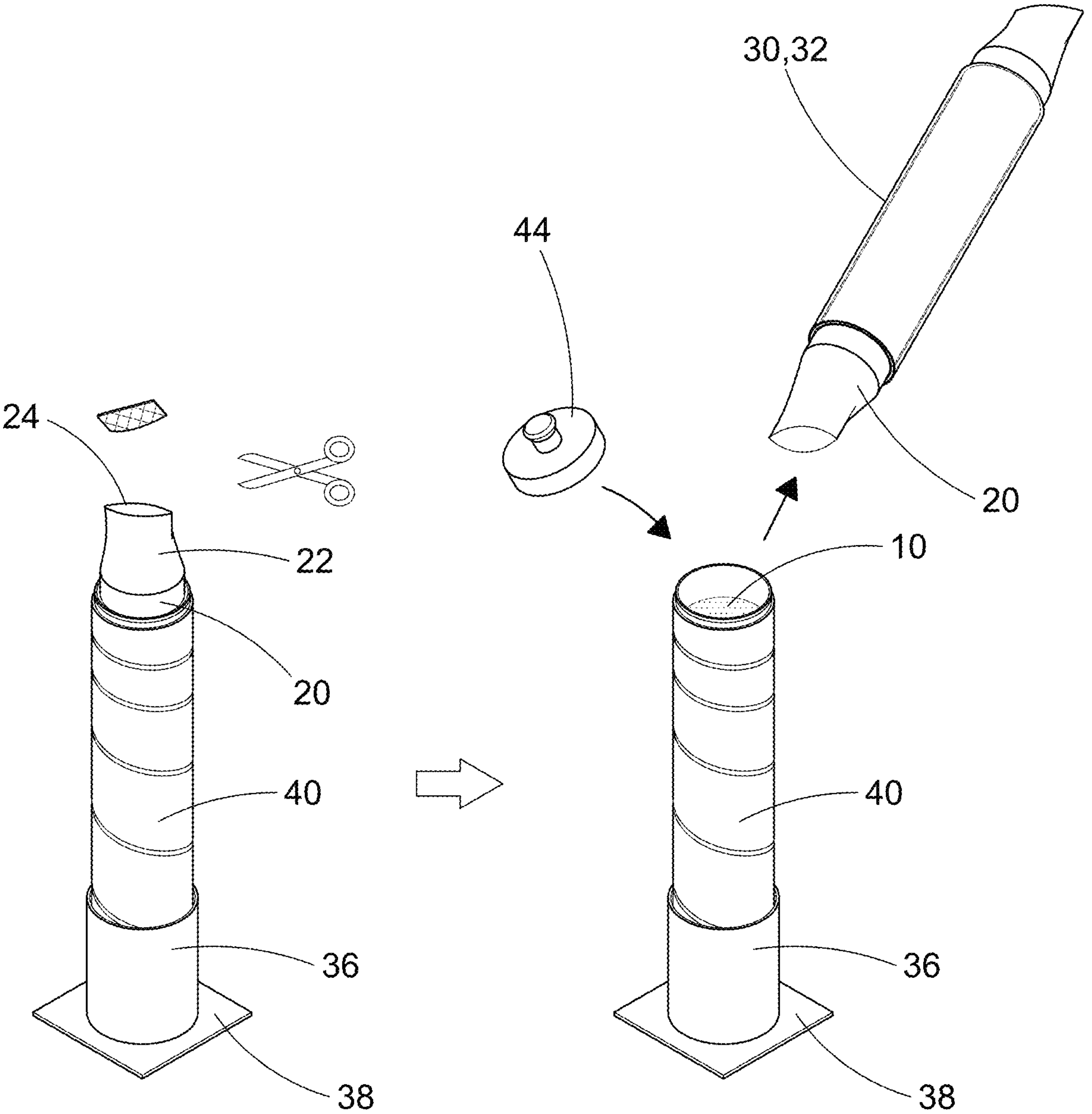
Figure 5:
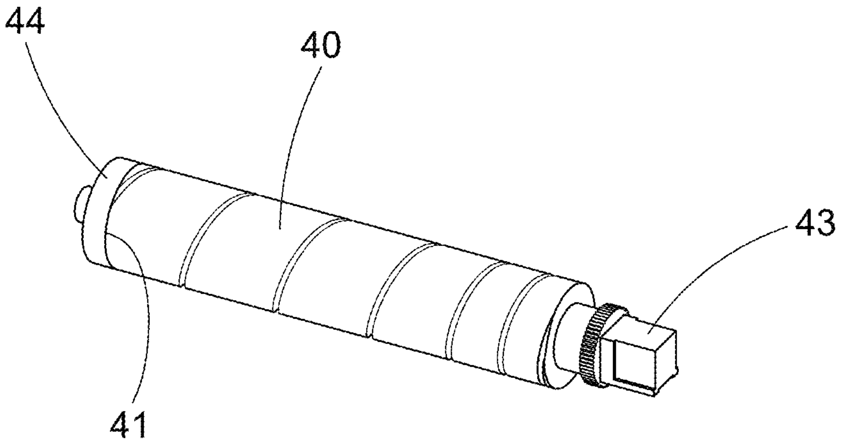

Step (b): Take an empty toner cartridge 40. The toner cartridge 40 is provided with an inner accommodation and at a bottom end 41 thereof with an opening 42 in communication with the inner accommodation. Thereafter, sleeve the toner cartridge 40 from top to bottom onto the container 20 via the opening 42 from the first end 21 to the second end 22 so as to receive the container 20, the molding sheet 30 and the tubular jig 32 in the inner accommodation thereof, as shown in FIG. 3. Thereafter, take the toner cartridge 40 as well as the container 20, the molding sheet 30 and the tubular jig 32 out of the retaining barrel 36, and then turn the toner cartridge 40 upside down and insert a top end 43 of the toner cartridge 40 into the retaining barrel 36. In this way, the second end 22 of the container 20 faces upwardly and is exposed outside the toner cartridge 40, as shown in FIG. 4

Step (c): Form an air permeable hole 24 at the second end 22 of the container 20 by scissors, cutting or other feasible way, such that the air permeable hole 24 is in air communication with the inner accommodation of the container 20.

Step (d): Withdraw the container 20, the molding sheet 30 and the tubular jig 32 from the toner cartridge 40, such that the toner 10 will leave the container 20 via the toner outlet 23 due to the gravity or inertia and stay inside the toner cartridge 40, as shown in FIG. 4. Because the air permeable hole 24 allows air to enter from the second end 22 into the inner accommodation of the container 20, the situation that the toner 10 cannot flow out from the toner outlet 23 due to the vacuum phenomenon can be prevented. In another embodiment, the tubular jig 32 may be withdrawn out from the toner cartridge 40 before the step (c), or after the step (c) and before the step (d).

Step (e): Take a cover 44 to seal the opening 42 of the toner cartridge 40 so as to complete the filling task of the toner cartridge 40.

With the above-mentioned technical features, the method for filling toner into a toner cartridge provided by the present invention can be operated easily and conveniently, and the toner 10 can be effectively and positively filled into the toner cartridge 40 without the problem of toner leakage. Further, because the container 20 has a simple structural design, the amount of residual toner can be reduced after the toner is filled into the toner cartridge 40. Moreover, the costs of the utensils and devices used in the method of the present invention are quite low, and the amount of waste is also small after the toner is filled. As such, the method of the present invention is environmentally friendly, thereby achieving the objectives of the present invention.

What is claimed is:

1. A method for filling toner into a toner cartridge, comprising the steps of:

(a) taking a container, which accommodates the toner therein and has a first end and a second end opposite to the first end, and then forming a toner outlet at the first end;

(b) taking the toner cartridge, which is provided at an end thereof with an opening, and then sleeving the toner cartridge onto the container via the opening from the first end to the second end;

(c) forming an air permeable hole at the second end of the container;

(d) withdrawing the container from the toner cartridge to enable the toner to leave the container via the toner outlet and stay inside the toner cartridge; and (e) sealing the opening of the toner cartridge by a cover.

2. The method as claimed in claim 1, wherein in the step (a) the container is held upright, such that the first end of the container faces upward.

3. The method as claimed in claim 2, wherein after the toner cartridge is sleeved onto the container from top to bottom in the step (b), the toner cartridge is turned upside down, such that the first end of the container faces downward.

4. The method as claimed in claim 1, wherein in the step (a) the container is inserted into a tubular jig; in the step (b) the toner cartridge is sleeved onto the container and the tubular jig.

5. The method as claimed in claim 4, wherein in the step (a) the container is wrapped by a molding sheet, and then the container and the molding sheet are inserted into the tubular jig.

6. The method as claimed in claim 4, wherein the first end and the second end are exposed outside the tubular jig.

7. The method as claimed in claim 4, wherein the tubular jig is withdrawn out from the toner cartridge before the step (c) or after the step (c).

8. The method as claimed in claim 1, wherein in the step (a) after the toner outlet is formed, the first end of the container is backwardly folded toward the second end, such that the toner outlet is temporarily closed.

9. The method as claimed in claim 1, wherein the container is made from a soft plastic material.

* * * * *